(12) United States Patent
Bonnet et al.

(10) Patent No.: US 8,178,179 B2
(45) Date of Patent: May 15, 2012

(54) PVDF-BASED CONDUCTIVE COMPOSITION

(75) Inventors: Anthony Bonnet, Beaumont le Roger (FR); Michael Werth, Bernay (FR); Karine Triballier, Bosrobert (FR)

(73) Assignee: Arkema France, Colombes (FR)

( * ) Notice: Subject to any disclaimer, the term of this patent is extended or adjusted under 35 U.S.C. 154(b) by 610 days.

(21) Appl. No.: 12/297,020

(22) PCT Filed: Mar. 20, 2007

(86) PCT No.: PCT/FR2007/050963
§ 371 (c)(1),
(2), (4) Date: Jun. 29, 2009

(87) PCT Pub. No.: WO2007/119014
PCT Pub. Date: Oct. 25, 2007

(65) Prior Publication Data
US 2010/0015376 A1    Jan. 21, 2010

(30) Foreign Application Priority Data
Apr. 14, 2006 (FR) ...................................... 0603335

(51) Int. Cl.
*B32B 1/08* (2006.01)
(52) U.S. Cl. ....... 428/35.7; 428/36.9; 252/500; 252/511

(58) Field of Classification Search ................. 428/35.7, 428/36.9; 252/500, 511
See application file for complete search history.

(56) References Cited

U.S. PATENT DOCUMENTS

| 4,582,864 A * | 4/1986 | Abe et al. ...................... 523/220 |
| 2003/0022997 A1 * | 1/2003 | Faulkner ....................... 525/199 |
| 2003/0104150 A1 | 6/2003 | Bonnet et al. |

FOREIGN PATENT DOCUMENTS

| FR | 2899904 | * 10/2007 |
| JP | 2004-331725 | * 11/2004 |
| WO | WO-2007-119014 A1 | * 10/2007 |

* cited by examiner

*Primary Examiner* — Peter D. Mulcahy
*Assistant Examiner* — Henry Hu
(74) *Attorney, Agent, or Firm* — Thomas F. Roland

(57) ABSTRACT

The invention concerns a conductive composition comprising (by weight): 30 to 60 parts of a fluid PVDF; 25 to 62 parts of a viscous PVDF; 8 to 13 parts of a conductive filler; 0 to 2 parts of a fire retardant agent; 0 to 0.05 parts of a nucleating agent, based on a total of 100 parts. Preferably, it comprises by weight: 35 to 50 parts of a fluid PVDF; 45 to 55 parts of a viscous PVDF; 8 to 13 parts of a conductive filler; 0 to 2 parts of a fireproof agent; 0 to 0.05 parts of a nucleating agent, based on a total of 100 parts. Preferably, the conductive composition has a viscosity in the molten state at 230° C. of less than $10^6$ Pa·s, preferably between $10^2$ and $10^6$ Pa·s. The invention also concerns multilayer structures combining the conductive composition and a thermoplastic polymer or a metal.

10 Claims, No Drawings

PVDF-BASED CONDUCTIVE COMPOSITION

This application claims benefit, under U.S.C. §119 or §365 of French Application Number FR 06.03335, filed Apr. 14, 2006; and PCT/FR2007/050963 filed Mar. 20, 2007.

FIELD OF THE INVENTION

The subject matter of the present invention is a conducting composition based on polyvinylidene fluoride (PVDF). This composition may especially be used for the manufacture of multilayer structures such as tubes or pipes.

SUMMARY OF THE INVENTION

PVDF is known to offer excellent mechanical stability properties, very great chemical inertness and good aging resistance. For some applications, such as for example the transfer of volatile inflammable solvents or petrol, it is necessary to make the PVDF electrically conducting and to achieve a resistivity of less than $10^6$ Ω.cm.

To achieve this level of resistivity, it is necessary to incorporate a sufficient amount of a conducting filler (such as carbon black or carbon nanotubes) into the PVDF without degrading the mechanical properties of the PVDF, while still maintaining the ease with which PVDF can be extruded. The incorporation, also called compounding, generally takes place using an extruder and granules (the compound) are recovered therefrom. The compound is then re-extruded so as to be made into the desired form (tube, pipe, container, etc.). It is necessary for the compound to retain its good mechanical and conductivity properties when it is re-extruded. This is referred to as a shear-stable compound.

The applicant has developed a PVDF-based conducting composition which exhibits good mechanical properties and good surface resistivity and which retains said properties when the composition is re-extruded, that is to say the composition is shear-stable.

International Application WO 99/33908 describes an antistatic composition based on a polyamide containing a carbon black having a BET surface area of between 5 and 200 m²/g (ASTM D 3037-89) and a DBP oil absorption of between 50 and 300 ml/100 g (ASTM D 2414-90). This application does not refer to PVDF.

Application US 2003/0104150 describes a conducting composition based on PVDF, carbon black and a styrene/butadiene/methyl methacrylate triblock copolymer. The carbon black is for example Ensaco 250. This application does not describe the composition of the invention as it does not describe the advantage of mixing a viscous PVDF with a fluid PVDF.

Application US 2003/0022997 describes a composition based on a fluoroelastomer based on VDF, HFP and TFE (FKM) and on a PVDF. This composition may be made conducting using a carbon black. This application does not describe the composition according to the invention.

SUMMARY OF THE INVENTION

The invention relates to a conducting composition comprising, (by weight):
  30 to 60 parts of a fluid PVDF;
  25 to 62 parts of a viscous PVDF;
  8 to 13 parts of a conducting filler;
  0 to 2 parts of a fire retardant; and
  0 to 0.05 parts of a nucleating agent,
  the total making 100 parts.

Preferably, it comprises, by weight:
  35 to 50 parts of a fluid PVDF;
  45 to 55 parts of a viscous PVDF;
  8 to 13 parts of a conducting filler;
  0 to 2 parts of a fire retardant; and
  0 to 0.05 parts of a nucleating agent,
  the total making 100 parts.

Preferably, the conducting composition has a melt viscosity of less than $10^6$ Pa·s, preferably between $10^2$ and $10^6$ Pa·s.

The invention also relates to multilayer structures combining the conducting composition with a thermoplastic polymer or a metal.

DETAILED DESCRIPTION OF THE INVENTION

With regard to the PVDF, this is a vinylidene fluoride homopolymer (VDF of formula $CH_2=CF_2$) or a PVDF copolymer, that is to say a copolymer of VDF and at least one other monomer copolymerizable with the VDF, said copolymer containing at least 50%, advantageously at least 75% and preferably at least 85% VDF by weight.

The comonomer may be a fluoromonomer chosen for example from: vinyl fluoride; trifluoroethylene (VF3); chlorotrifluoroethylene (CTFE); 1,2-difluoroethylene; tetrafluoroethylene (TFE); hexafluoropropylene (HFP); perfluoro (alkylvinyl)ethers, such as perfluoro(methylvinyl)ether (PMVE), perfluoro(ethylvinyl)ether (PEVE) and perfluoro (propylvinyl)ether (PPVE); perfluoro(1,3-dioxole); and perfluoro(2,2-dimethyl-1,3-dioxole) (PDD). Preferably, the optional comonomer is chosen from chlorotrifluoroethylene (CTFE), hexafluoropropylene (HFP), trifluoroethylene (VF3) and tetrafluoroethylene (TFE).

The comonomer may also be an olefin such as ethylene or propylene.

The term "fluid PVDF" denotes a thermoplastic PVDF having a melt viscosity (measured at 230° C. and at 100 s⁻¹) of between 4 and 15 kP, preferably between 4 and 10 kP. Preferably the fluid PVDF is a homopolymer.

The term "viscous PVDF" denotes a thermoplastic PVDF having a melt viscosity (measured at 230° C. and at 100 s⁻¹) of between 15 and 40 kP, preferably between 15 and 30 kP. Preferably, the viscous PVDF is a copolymer, more particularly a VDF/HFP copolymer.

With regard to the conducting filler, this may for example be a carbon black, graphite, carbon nanotubes or any other additive capable of making the composition conducting and preventing the build-up of static electricity. Carbon black is more particularly preferred because of its wide commercial availability and its good performance.

When the carbon black content in a polymeric composition is increased, the resistivity firstly changes little, then, when a critical threshold, called the percolation threshold, is reached, the resistivity drops very suddenly to reach a relatively stable level (plateau region) where a further increase in the carbon black content barely modifies the resistivity.

Apart from its electrically conducting properties, carbon black behaves like a filler such as talc, chalk or kaolin, and therefore affects the mechanical properties of the polymer. A person skilled in the art knows that when the filler content increases, the melt viscosity of the compound increases, as does its elastic modulus. On can refer to the following book for more details about fillers in polymers: "Handbook of fillers and reinforcement of plastics", Van Nostrand Reinhold Company, ISBN 0-442-25372-9 especially in chapter II, section II and in chapter 16 section VI.

Preferably, the carbon black has a BET surface area of between 50 and 200 m²/g, preferably between 50 and 100 m²/g (ASTM D 3037-89) and a DBP (dibutyl phthalate) absorption of between 150 and 300 ml/100 g, preferably between 150 and 250 ml/100 g (ASTM D 2414-90). Preferably, the carbon black has a volume resistivity (measured on a FINATHENE 47100 HDPE compound containing 25% carbon black by weight) of less than 20 Ω.cm, advantageously less than 15 Ω.cm, and preferably less than 10 Ω.cm.

This type of carbon black (which is less structured) may be termed a conducting or semiconducting carbon black in comparison with extra-conducting carbon blacks whose BET surface area is greater than 500 m²/g and whose DBP absorption is greater than 300 ml/100 g.

The fact of using a less structured carbon black means that its content must be increased in order to obtain a resistivity <$10^6$ Ω.cm, that is to say that the percolation threshold is obtained for a higher content, of the order of 10% by weight. This has the advantage that the metering of the carbon black is more precise than with an extra-conducting carbon black for which the percolation threshold lies at around 3% by weight.

The carbon blacks sold by TIMCAL under the name ENSACO® 250 or ENSACO® 260 are particularly effective.

Characteristics of ENSACO® 250
BET surface area (ATSM D3037): 65 m²/g
DBP absorption (ASTM D2414): 190 ml/100 g
Density (ASTM D1513): 170 kg/m³
pH (ASTM D1512): 8-11
Volume resistivity (25% in FINATHENE 47100): <10 Ω.cm.

Characteristics of ENSACO® 260
BET surface area (ATSM D3037): 70 m²/g
DBP absorption (ASTM D2414): 190 ml/100 g
Density (ASTM D1513): 170 kg/m³
pH (ASTM D1512): 8-11
Volume resistivity (25% in FINATHENE 47100): <5 Ω.cm.

With regard to the fire retardant, this may be an organic or inorganic compound. This may for example be a calcined or hydrated aluminium silicate, a calcium tungstate or possibly a nanofiller, such as a montmorillonite.

With regard to the nucleating agent, its function is to promote rapid crystallization of the composition, thereby making it possible to achieve a stable composition in terms of mechanical properties (thus avoiding what is called "cold" crystallization). It may for example be PTFE particles.

With regard to the composition, this comprises, by weight:
30 to 60 parts of a fluid PVDF;
25 to 62 parts of a viscous PVDF;
8 to 13 parts of a conducting filler;
0 to 2 parts of a fire retardant; and
0 to 0.05 parts of a nucleating agent,
the total making 100 parts.

Preferably, it comprises, by weight:
35 to 50 parts of a fluid PVDF;
45 to 55 parts of a viscous PVDF;
8 to 13 parts of a conducting filler;
0 to 2 parts of a fire retardant; and
0 to 0.05 parts of a nucleating agent,
the total making 100 parts.

Preferably, it has been found that the composition for which the fluid PVDF is a homopolymer and the viscous PVDF is a copolymer, more particularly a VDF/HFP copolymer containing less than 10% HFP by weight, exhibits excellent chemical resistance.

Also preferably, better chemical resistance is obtained when the composition contains no polymer other than the fluid PVDF and the viscous PVDF.

Preferably, the composition is extrudable (that is to say it can be formed using standard extrusion techniques) and has a melt viscosity (at 230° C.) not exceeding $10^6$ Pa·s, preferably between $10^2$ and $10^6$ Pa·s.

The composition is prepared by melt blending or solvent blending the various ingredients. In the case of melt blending, blending tools suitable for thermoplastics are used, advantageously an extruder. In the case of solvent blending, the various ingredients are blended in a suitable solvent and then the solvent is evaporated.

When the composition is in powder form, the technique of cryogenic grinding may be used to grind the granules of the composition.

Forming of the Composition

The composition according to the invention may be extruded in the form of tubes, plates, rods, films or sheets. The rods are used for being subsequently converted into various components such as for example gears, containers, valves, parts of a pump body, etc.

The composition may also be injection moulded. The technique of injection moulding makes it possible for example to obtain electrodes, seals, etc.

The composition according to the invention may also be dissolved in a solvent for PVDF, such as N-methylpyrrolidone, dimethylformamide (DMF) or dimethylsulphoxide (DMSO), and may be used as a paint. It is also possible in certain cases to use acetone.

The composition according to the invention may also be applied by the technique of electrostatic powder-coating. The composition in granule form is firstly ground before being reduced to a powder. It may also be converted by hot compression moulding.

The coextrusion technique makes it possible to obtain various types of multilayer structures in the form of tubes, plates, films, sheets, hollow bodies, etc.

Multilayer Structures Comprising a Layer of the Composition According to the Invention and a Layer of a Thermoplastic Polymer One example of a multilayer structure comprises:
a layer of at least one thermoplastic polymer; and
a layer of the conducting composition.

Another example of a multilayer structure comprises, in the following order:
a layer of the conducting composition;
a layer of at least one thermoplastic polymer; and
a layer of the conducting composition.

The multilayer structure may be formed into tubes, plates, films, sheets or hollow bodies. In the case of a tube or a hollow body, the layer of the conducting composition may be the inner layer or the outer layer. The multilayer structure in the form of a tube or hollow body therefore comprises in the following order:
an inner layer of at least one thermoplastic polymer; and
an outer layer of the conducting composition;
or else
an inner layer of the conducting composition; and
an outer layer of at least one thermoplastic polymer;
or else
an inner layer of the conducting composition;
an interlayer of at least one thermoplastic polymer; and
an outer layer of the conducting composition.

For example, a pipe comprising an inner layer of the conducting composition and an outer layer of at least one thermoplastic polymer may be used to transport an inflammable liquid (petrol, solvent, etc.). Likewise, a pipe comprising an inner layer of at least one thermoplastic polymer and an outer layer of the conducting composition may be used in an explosive atmosphere.

The thermoplastic polymer is for example:
a polyamide (for example nylon-6, nylon-11, nylon-12, nylon-6,6, etc.);
a polyolefin (PE, PP, EPDM);
polyvinyl chloride (PVC);
chlorinated PVC (C-PVC);
polyethylene terephthalate (PET);
EVOH (ethylene/vinyl alcohol copolymer);
polyetheretherketone (PEEK);
polyoxymethylene (Acetal);
polyethersulphone;
a polyurethane;
a fluoropolymer such as a PVDF, a polyvinyl fluoride, an ethylene/TFE copolymer (ETFE), a TFE/HFP copolymer (FEP), an ethylene/TFE/HFP copolymer (EFEP), a TFE/HFP/VDF copolymer (THV) or a PTFE.

In the above structures, at least one tie layer may be placed between at least one layer of the conducting composition and at least one layer of the thermoplastic polymer so as to increase the adhesion between the layers. This tie layer may optionally be a double layer, that is to say that, between the layer of thermoplastic polymer and the layer of the conducting composition, it is possible to place a first layer of one tie and a second layer of another tie, the two tie layers being placed against one another. For example, when the thermoplastic polymer is a polyethylene, the first tie layer may be a polyolefin carrying polar functional groups and the second tie layer may be a fluoropolymer carrying polar functional groups that react with the polar functional groups of the polyolefin. The fluoropolymer carrying polar functional groups may for example be a PVDF onto which carboxylic acid anhydride functional groups have been grafted and the polyolefin carrying polar functional groups may be an ethylene/glycidyl(meth)acrylate copolymer.

Preferably, in all the structures described above, the layers are placed against one another.

Multilayer Structures Comprising a Layer of the Composition According to the Invention and a Metal The multilayer structure may also comprise a layer of the conducting composition and a layer of a metal. The metal layer may optionally be coated with an adhesion primer. Preferably, a tie layer is placed between the metal layer and the layer of the conducting composition, or else between the adhesion primer layer and the layer of the conducting composition. The structure therefore comprises, in the following order:
a layer of metal;
optionally, an adhesion primer layer;
optionally, a tie layer; and
a layer of the conducting composition.

The tie is for example a fluoropolymer carrying polar functional groups, for example a PVDF onto which carboxylic acid anhydride functional groups or epoxide functional groups have been grafted. The application EP 1484346 describes a process for obtaining a PVDF carrying polar functions (irradiation grafted process).

This structure may be formed into a tube or a hollow body. The layer of the conducting composition is then the outer layer or the inner layer.

Examples

The compounds were produced on a Buss extruder at 230° C. with a throughput of 20 kg/hour. The PVDFs were introduced into the first zone and then the carbon black in the second zone. The melt viscosities are given at 230° C. and at 100 s$^{-1}$.

Products Used

Kynar 720 (K720): PVDF homopolymer sold by Arkema, having a melt viscosity of 6-12 kP.

Kynarflex 2850 (KF 2850): VDF/HFP copolymer (6% HFP by weight) having a viscosity of 23-27 kP.

Kynarflex 2950-05 (KF 2950): VDF/HFP copolymer (17% HFP by weight) having a viscosity of 6-12 kP.

Kynarflex 2750-01 (KF 2750): VDF/HFP copolymer (17% HFP by weight) having a viscosity of 20-25 kP.

Ensaco 260: see the characteristics given above.

Ketjenblack 300 EC: carbon black from Akzo Chimie, having a DBP absorption of between 350 and 385 ml/100 g and a BET surface area of 800 m$^2$/g.

Measurements Taken $\sigma_1$ ($\Omega$cm): volume resistivity measured after blending in the extruder;
$\sigma_2$ ($\Omega$cm): volume resistivity measured after a second extrusion;
$C_{23}$ (kJ/m$^2$): Charpy impact strength measured at 23° C.;
$C_{-30}$ (kJ/m$^2$): Charpy impact strength measured at −30° C.;
$\epsilon_{r23}$(%): strain at break measured at 23° C.;
$\sigma_T$ ($\Omega$cm): volume resistivity measured on a tube of 32 mm outside diameter and 3 mm thickness; and
$\epsilon_{r23}$(%): strain at break measured at 23° C. on a tube of 32 mm outside diameter and 3 mm thickness.

The compound of Example 1 exhibits excellent electrical and mechanical properties:
good shear stability (see the $\sigma_1$ and $\sigma_2$ values);
volume resistivity <10$^6$ $\Omega$cm; and
good impact strength.

TABLE I

| Examples | Composition (in % by weight) | $\sigma_1$ [$\Omega$ cm] | $\sigma_2$ [$\Omega$ cm] | $C_{23}$ [kJ/m$^2$] | $C_{-30}$ [kJ/m$^2$] | $\epsilon_{r23}$ [%] | $\sigma_T$ [$\Omega$ cm] | $\epsilon_{r23}$ [%] |
|---|---|---|---|---|---|---|---|---|
| Ex. 1 | K720 (40.5%) + KF2850 (49.5%) + Ensaco 260 (10%) | 40 | 45 | 8 | 4 | 30 | 100 | 25 |
| Ex. 2 | K720 (39.6%) + KF2850 (48.4%) + Ensaco 250 (12%) | 10$^3$ | 10$^7$ | 8 | 3 | 25 | 10$^6$ | 20 |
| Ex. 3 (comp.) | K720 (43.65%) + KF2850 (53.35%) + KB 300 EC (3%) | 10$^3$ | >10$^{10}$ | 3 | <1 | <10 | >10$^{10}$ | <10 |
| Ex. 4 (comp.) | K720 (90%) + Ensaco 250 (10%) | 50 | 45 | 5 | <1 | <10 | 60 | <10 |
| Ex. 5 (comp.) | K720 (90%) + Ensaco 260 (12%) | 7 × 10$^4$ | 10$^6$ | 5 | <1 | <10 | 10$^6$ | <10 |
| Ex. 6 (comp.) | K720 (97%) + KB 300 EC (3%) | 7 × 10$^2$ | 10$^5$ | 2.8 | <1 | <10 | 10$^8$ | <10 |
| Ex. 7 | KF2950-05 (40.5%) + KF 2750-01 (49.5%) + Ensaco 260 | 43 | 51 | no break | 4.5 | 120 | 110 | 10$^7$ |

The invention claimed is:

1. Conducting composition comprising, by weight
   30 to 60 parts of a fluid thermoplastic polyvinylidene fluoride (PVDF) having a melt viscosity (measured at 230° C. and at 100 s$^{-1}$) of between 4 and 15 kP;
   25 to 62 parts of a viscous thermoplastic PVDF having a melt viscosity (measured at 230° C. and at 100 s$^{-1}$) of between 15 and 40 kP;
   8 to 13 parts of a conducting filler;
   0 to 2 parts of a fire retardant; and
   0 to 0.05 parts of a nucleating agent,
   the total making 100 parts, wherein both said fluid thermoplastic PVDF and said viscous thermoplastic PVDF are a vinylidene fluoride homopolymer or vinylidene fluoride copolymer containing at least 75% by weight of VDF monomer units.

2. Composition according to claim 1, comprising, by weight:
   35 to 50 parts of fluid PVDF;
   45 to 55 parts of viscous PVDF;
   8 to 13 parts of a conducting filler;
   0 to 2 parts of a fire retardant; and
   0 to 0.05 parts of a nucleating agent,
   the total making 100 parts.

3. Composition according to claim 1, wherein the fluid PVDF is a homopolymer.

4. The conducting composition of claim 1, wherein said melt viscosity for the fluid PVDF is between 4 and 10 kP.

5. Composition according to claim 1, wherein the viscous PVDF is a copolymer.

6. Composition according to claim 5, wherein the viscous PVDF is a VDF/HFP copolymer containing less than 10% hexafluoropropylene (HFP) by weight.

7. Composition according to claim 1, wherein the conducting filler is a carbon black having a BET surface area of between 50 and 200 m$^2$/g (ASTM D 3037-89) and a DBP (dibutyl phthalate) absorption of between 150 and 300 ml/100 g (ASTM D 2414-90).

8. Composition according to claim 7, wherein the conducting filler is a carbon black having a BET surface area of between 50 and 100 m$^2$/g and a DBP (dibutyl phthalate) absorption of between 150 and 250 ml/100 g.

9. Composition according to claim 1, wherein the conducting filler has a volume resistivity (measured on a FINATHENE 47100 HDPE compound containing 25% carbon black by weight) of less than 20 Ω.cm.

10. Composition according to claim 1, wherein the conducting composition has a melt viscosity at 230° C. of less than 10$^6$ Pa·s.

* * * * *